United States Patent
Tailor et al.

(10) Patent No.: US 9,307,502 B1
(45) Date of Patent: Apr. 5, 2016

(54) MANAGING INTER-CELL INTERFERENCE

(71) Applicant: Sprint Spectrum LP, Overland Park, KS (US)

(72) Inventors: Pinal Kumari Tailor, Ashburn, VA (US); Karan Raj Sachdev, Austin, TX (US); Vijendrakumar Ashiwal, Pittsburgh, PA (US)

(73) Assignee: Sprint Spectrum L.P., Overland Park, KS (US)

(*) Notice: Subject to any disclaimer, the term of this patent is extended or adjusted under 35 U.S.C. 154(b) by 106 days.

(21) Appl. No.: 14/042,170

(22) Filed: Sep. 30, 2013

(51) Int. Cl.
*H04W 52/24* (2009.01)

(52) U.S. Cl.
CPC .................................. *H04W 52/243* (2013.01)

(58) Field of Classification Search
CPC .............................. H04W 76/02; G06F 1/3209
See application file for complete search history.

(56) References Cited

U.S. PATENT DOCUMENTS

| 8,346,173 | B2 | 1/2013 | Chen et al. | |
|---|---|---|---|---|
| 8,379,574 | B2 | 2/2013 | Hilborn | |
| 8,804,634 | B2 * | 8/2014 | Gomes et al. | 370/329 |
| 9,100,923 | B2 * | 8/2015 | Yamazaki | |
| 2015/0031408 | A1 * | 1/2015 | Kalla et al. | 455/522 |

* cited by examiner

*Primary Examiner* — Chandrahas Patel (57) ABSTRACT

An application requirement and a mobility is determined for each of a first plurality of wireless devices in communication with a first access node. Based on the respective application requirement and mobility, a priority of each of the first plurality of wireless devices. At least one wireless device comprising a priority meeting a priority criteria is selected from among the first plurality of wireless devices, and a transmission power of a signal between the first access node and the selected at least one wireless device is reduced.

12 Claims, 7 Drawing Sheets

MANAGING INTER-CELL INTERFERENCE

TECHNICAL BACKGROUND

In a wireless communication network, a wireless device at the edge of an access node coverage area can experience signal interference when frequencies are re-used by neighboring access nodes. Such inter-cell interference (ICI) may degrade data transmission near coverage area edges, reducing data throughput and spectral efficiency to wireless devices near a coverage area edge. Mitigating and/or reducing inter-cell interference is therefore of great important to communication network operators.

OVERVIEW

In operation, an application requirement and a mobility are determined for each of a first plurality of wireless devices in communication with a first access node. Based on the respective application requirement and mobility, a priority of each of the first plurality of wireless devices. At least one wireless device comprising a priority meeting a priority criteria is selected from among the first plurality of wireless devices, and a transmission power of a signal between the first access node and the selected at least one wireless device is reduced.

In an embodiment, an application requirement and a mobility are determined for each of a second plurality of wireless devices in communication with a second access node, and a priority is determined of each of the second plurality of wireless devices based on the respective application requirement and mobility. At least one wireless device comprising a priority meeting a priority criteria is selected from among the second plurality of wireless devices, and information is exchanged between the first access node and the second access node about the at least one wireless device selected from among the first plurality of wireless devices and the at least one wireless device selected from among the second plurality of wireless devices. At a first time, the transmission power is reduced of the signal between the first access node and the at least one wireless device selected from among the first plurality of wireless devices, and at a second time a transmission power is reduced of a signal between the second access node and the at least one wireless device selected from among the second plurality of wireless devices.

DETAILED DESCRIPTION

Figure 1:
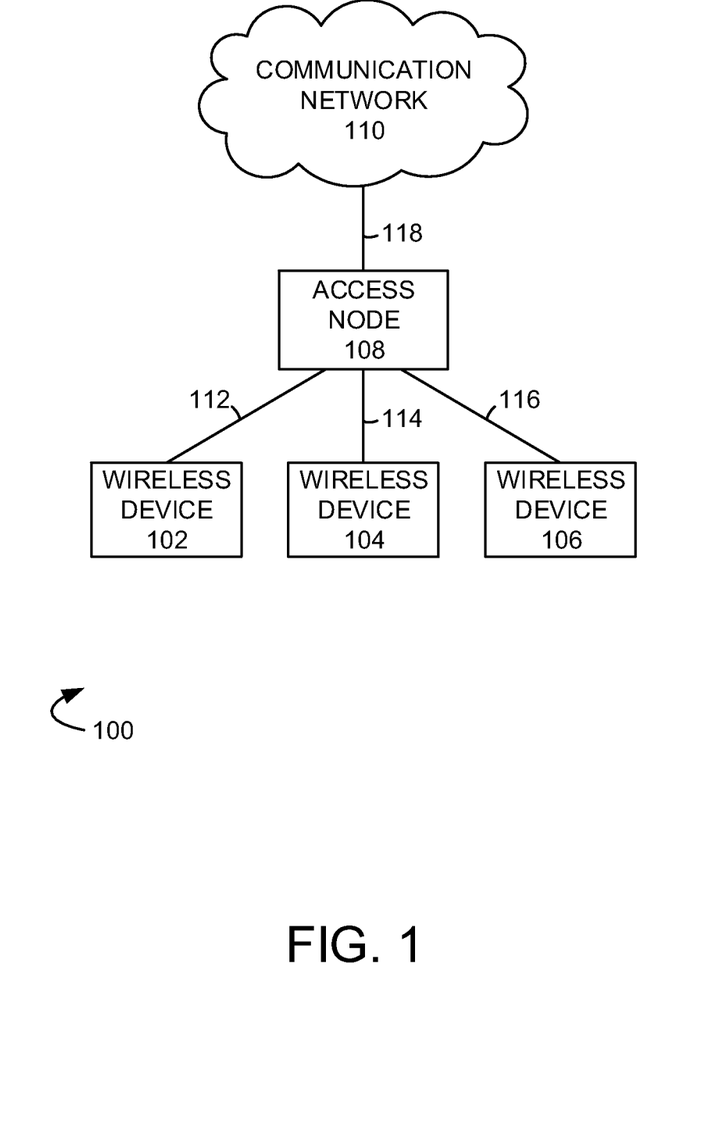
FIG. 1 illustrates an exemplary communication system to manage inter-cell interference.

FIG. 1 illustrates an exemplary communication system 100 to manage inter-cell interference comprising wireless devices 102, 104 and 106, access node 108, and communication network 110. Examples of wireless devices 102, 104 and 106 can comprise a cell phone, a smart phone, a computing platform such as a laptop, palmtop, or tablet, a personal digital assistant, or an internet access device, including combinations thereof. Wireless device 102 is in communication with access node 108 over communication link 112. Wireless device 104 is in communication with access node 108 over communication link 114. Wireless device 106 is in communication with access node 108 over communication link 116.

Access node 108 is a network node capable of providing wireless communications to wireless devices 102, 104 and 106, and can be, for example, a base transceiver station, a radio base station, an eNodeB device, or an enhanced eNodeB device. Access node 104 is in communication with communication network 110 over communication link 118.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other data, for example, to support communications by a wireless device such as wireless devices 102, 104 and 106. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116 and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 108 and communication network 110 which are omitted for clarity, including additional processing nodes, routers, gateways, and physical and/or wireless data links for carrying data among the various network elements.

In a wireless communication network, a wireless device at the edge of an access node coverage area can experience signal interference when frequencies are re-used by neighboring access nodes. Such inter-cell interference (ICI) may degrade data transmission near coverage area edges, reducing data throughput and spectral efficiency to wireless devices near a coverage area edge. Interference mitigation and/or cancellation techniques can be employed to address inter-cell interference. However, some interference mitigation methods, such as inter-cell interference coordination (ICIC), may also cause a reduction in the data rate and/or throughput near coverage area edges.

In operation, an application requirement and a mobility are determined for each of a first plurality of wireless devices (such as wireless devices 102, 104 and 106) in communication with access node 108. A priority is determined of each of wireless devices 102, 104 and 106 based on the respective application requirement and mobility. At least one wireless device is selected comprising a priority meeting a priority criteria from among the first plurality of wireless devices, and a transmission power of a signal between the first access node and the selected at least one wireless device is reduced. In an embodiment, the selected wireless devices can comprise a priority below a priority threshold.

Figure 2:
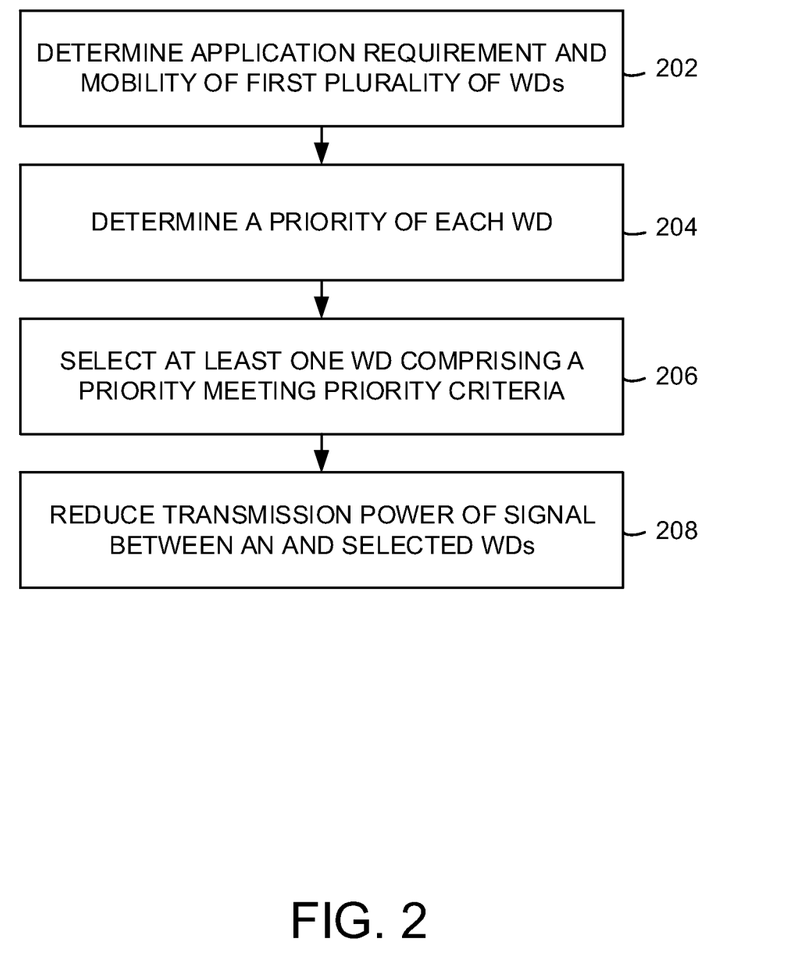
FIG. 2 illustrates an exemplary method of managing inter-cell interference.

FIG. 2 illustrates an exemplary method of managing inter-cell interference. In operation 202, an application requirement and a mobility are determined for each of a first plurality of wireless devices in communication with a first access node. For example, an application requirement and a mobility can be determined for each of wireless devices 102, 104 and 106. The application requirement can comprise a minimum data rate, a maximum permitted data delay, a minimum throughput, a maximum error rate, a maximum data loss rate, and the like, of an application running on a wireless device. For example, a delay sensitive application, such as a streaming audio application a streaming video application, a voice application (e.g., voice over internet protocol, voice over LTE, etc.), and the like, can comprise a relatively high required minimum data rate, a relatively low maximum permitted data delay, a relatively high minimum required throughput, a relatively low maximum permitted error rate, a relatively low maximum permitted data loss rate, and so forth. Conversely, a delay insensitive application, such as an email application, a messaging application, a web browsing application, and the like, can comprise a relatively low required minimum data rate, a relatively high maximum permitted data delay, a relatively high minimum required throughput, a relatively low maximum permitted error rate, a relatively low maximum permitted data loss rate, and so forth. The mobility can comprise a direction of motion, a speed of motion, an average direction and speed of motion over time, and the like. The mobility of a wireless device can also be determined based on a modulation and coding scheme assigned to a communication link between the wireless device and a serving access node, at least because a modulation and coding scheme can be reduced as the wireless device moves away from the serving access node.

Based on the respective application requirements and mobilities, a priority is determined of each of the first plurality of wireless devices (operation 204), and at least of the one wireless device comprising a priority meeting a priority criteria is selected from among the first plurality of wireless devices (operation 206). For example, it can be determined that wireless device 102 is running a voice over LTE application, is near a coverage area edge of access node 108, and is relatively stationary; that wireless device 104 is running an email application, and is moving toward access node 108; and that wireless device 106 is running an instant messaging application, is near a coverage area edge of access node 108, and is relatively stationary. Based on the respective application requirements and mobilities, it can be determined that wireless devices 102 and 104 do not meet the priority criteria, and that wireless device 106 meets the priority criteria.

A transmission power of a signal between the first access node and the selected at least one wireless device is reduced (operation 208). For example, based on the determination that wireless device 106 meets the priority criteria, a transmission power of a signal between the access node 108 and wireless device 106 can be reduced, while a transmission power of signals between access node 108 and wireless device 102 and 104 are not reduced. Thus, a transmission power of signals for relatively lower priority wireless devices can be reduced, while a transmission power of signals for relatively higher priority wireless devices can remain unreduced, to reduce inter-cell interference while balancing levels of resources provided to relatively higher priority users and to relatively lower users.

Figure 3:
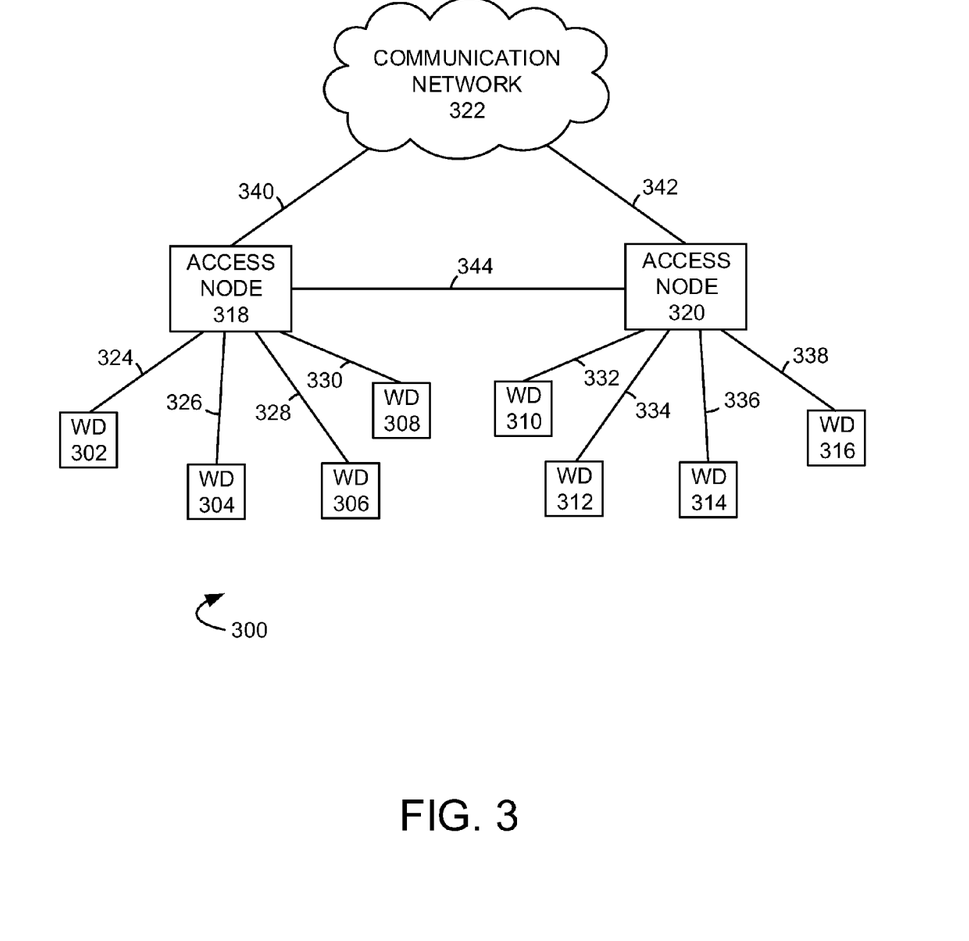
FIG. 3 illustrates another exemplary communication system to manage inter-cell interference.

FIG. 3 illustrates another exemplary communication system 300 to manage inter-cell interference comprising wireless devices 302, 304, 306, 308, 310, 312, 314 and 316, access nodes 318 and 320, and communication network 322. Examples of wireless devices 302-316 can comprise a cell phone, a smart phone, a computing platform such as a laptop, palmtop, or tablet, a personal digital assistant, or an internet access device, including combinations thereof. Wireless devices 302, 304, 306 and 308 are in communication with access node 318 over communication links 324, 326, 328 and 330, respectively. Wireless devices 310, 312, 314 and 316 are in communication with access node 320 over communication links 332, 334, 336 and 338, respectively.

Access node 318 and 320 are each a network node capable of providing wireless communications to wireless devices 302-316, and can be, for example, a base transceiver station, a radio base station, an eNodeB device, or an enhanced eNodeB device. Access node 318 is in communication with communication network 322 over communication link 340. Access node 320 is in communication with communication network 322 over communication link 342. Access nodes 318 and 320 are can also communicate with each other over communication link 344.

Communication network 322 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 322 can be capable of carrying voice information and other data, for example, to support communications by a wireless device such as wireless devices 302-316. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 322 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 322 may also comprise a wireless network, including base stations, wireless communication nodes, telephony switches, internet routers, network gateways, computer systems, communication links, or some other type of communication equipment, and combinations thereof.

Communication links 324, 326, 328, 330, 332, 334, 336, 338, 340, 342 and 344 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 318, access node 320 and communication network 322 which are omitted for clarity, including additional processing nodes, routers, gateways, and physical and/or wireless data links for carrying data among the various network elements.

Figure 4:
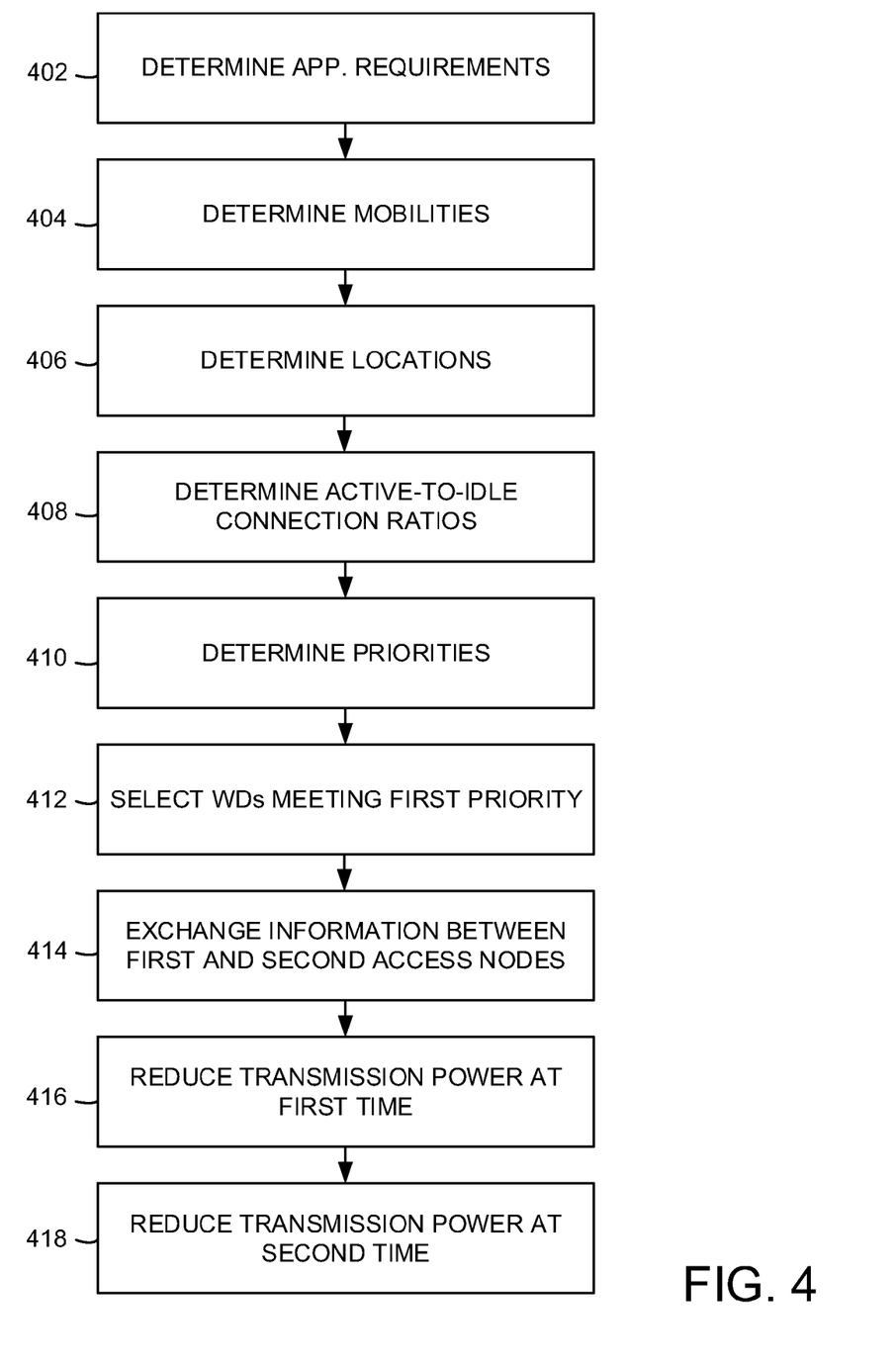
FIG. 4 illustrates another exemplary method of method of managing inter-cell interference.

FIG. 4 illustrates another exemplary method of managing inter-cell interference. For each of a first plurality of wireless devices in communication with a first access node, an application requirement is determined (operation 402). For example, an application requirement can be determined for each of wireless devices 302, 304, 306 and 308. The application requirement can comprise a minimum data rate, a maximum permitted data delay, a minimum throughput, a maximum error rate, a maximum data loss rate, and the like, of an application running on a wireless device. The application requirement can vary based on the application type, such as whether the application is a relatively delay sensitive application (such as a streaming audio application a streaming video application, a voice application, and the like) or a relatively delay insensitive application (such as an email application, a messaging application, a web browsing application, and the like).

Next, a mobility and a location are determined for each of the first plurality of wireless devices (operations 404 and 406). The mobility can comprise a direction of motion, a speed of motion, an average direction and speed of motion over time, and the like. The location of a wireless device can be determined based on GPS information of the wireless device, base station triangulation, or other information specifying the geographic location of the wireless device. The mobility and/or location of a wireless device can also be determined based on a modulation and coding scheme assigned to a communication link between the wireless device and a serving access node, at least because a modulation and coding scheme can be reduced as the wireless device moves away from the serving access node.

In addition, an active connection-to-idle connection ratio is determined for each of the first plurality of wireless devices (e.g., wireless devices 302-308) (operation 408). The active connection-to-idle connection ratio can indicate a level of interactivity of each wireless device with the communication system. The active connection-to-idle connection ratio can comprise a determination over a period of time of an amount of time that a wireless device is in active communication with an access node (e.g. access node 318) and an amount of time that the wireless device is in an idle or lower power state. The active connection-to-idle connection ratio can also comprise a determination over a period of time of a number of times that the wireless device changes from active communication to idle state and vice versa. When a wireless device spends a larger amount of time in active communication with access node 318, this can indicate that the wireless device comprises a relatively higher level of interactivity with communication network 300. Conversely, when a wireless device spends a smaller amount of time in active communication with access node 318, this can indicate that the wireless device comprises a relatively lower level of interactivity with communication network 300.

Based on the respective application requirement, mobility, location, and active connection-to-idle connection ratio of each wireless device, a priority is determined of each of the first plurality of wireless devices (operation 410), and at least one wireless device is selected comprising a priority meeting a priority criteria is selected from among the first plurality of wireless devices (operation 412). For example, it can be determined that wireless device 302 is running a voice over LTE application, is near a coverage area edge of access node 318, is relatively stationary, is located away from access node 320, and has a relatively low active connection-to-idle connection ratio; that wireless device 304 is running an email application, is moving toward access node 318, and has a relatively high active connection-to-idle connection ratio; that wireless device 306 is running a web browsing application, is near a coverage area edge of access node 318 and is near access node 320, is relatively stationary, and has a relatively high active connection-to-idle connection ratio; and that wireless device 308 is running an instant messaging application, is near a coverage area edge of access node 318 and is near access node 320, and is relatively stationary, and has a relatively high active connection-to-idle connection ratio. Based on the respective application requirements, mobilities and active connection-to-idle connection ratios, it can be determined that wireless devices 302 and 304 do not meet the priority criteria, and that wireless devices 306 and 308 meet the priority criteria. When the respective priorities of wireless devices 306 and 308 meet the priority criteria, wireless devices 306 and 308 can be selected.

When the at least one wireless device is selected, information about the determined priorities and selected wireless devices is exchanged between the first access node and a second access node (operation 414). For example, access nodes 318 and 320 can comprise neighbor access nodes, and further can be in communication with one or more wireless devices, the signals to which may cause interference with signals of its respective neighbor access node. Each of access node 318 and 320 can determine priorities of wireless devices, and can select at least one of the wireless devices based on the priorities. Further, access nodes 318 and 320 can exchange information about the determined priorities and selected wireless devices over communication link 344. For example, access node 318 can provide information to access node 320 about selected wireless devices 308 and 306. In addition, access node 320 can provide information about wireless device which are selected, for example, wireless devices 310 and 312. In an embodiment, the information comprises a downlink relative narrowband transmit power (RNTP) indicator. The information can further comprise an indication of interference conditions on physical resource block (PRB) level. In addition, the information can further comprise information about which resource blocks will be used with a highest transmission power. The information can enable each access node to employ a different transmission power pattern, and/or to configure power transmission levels for different frequency reuse models. Additionally, or alternatively, the information can be used to both indicate frequency selective power allocations as well as scheduling strategies, since both may have an impact on the transmit power per resource in a given time interval.

Using the exchanged information, a transmission power of a signal between the first access node and the at least one wireless device selected from among the first plurality of wireless devices is reduced at a first time (operation 416), and a transmission power of a signal between the second access node and the at least one wireless device selected from among the second plurality of wireless devices is reduced at a second time (operation 418). Thus, a transmission power of signals for relatively lower priority wireless devices in communication with access node 318 can be reduced at a first time, and a transmission power of signals for relatively lower priority wireless devices in communication with access node 320 can be reduced at a second time, while a transmission power of signals for relatively higher priority wireless devices in communication with access nodes 318 and 320 can remain unreduced, to reduce inter-cell interference while providing a required level of service to relatively higher priority users.

Figure 5:
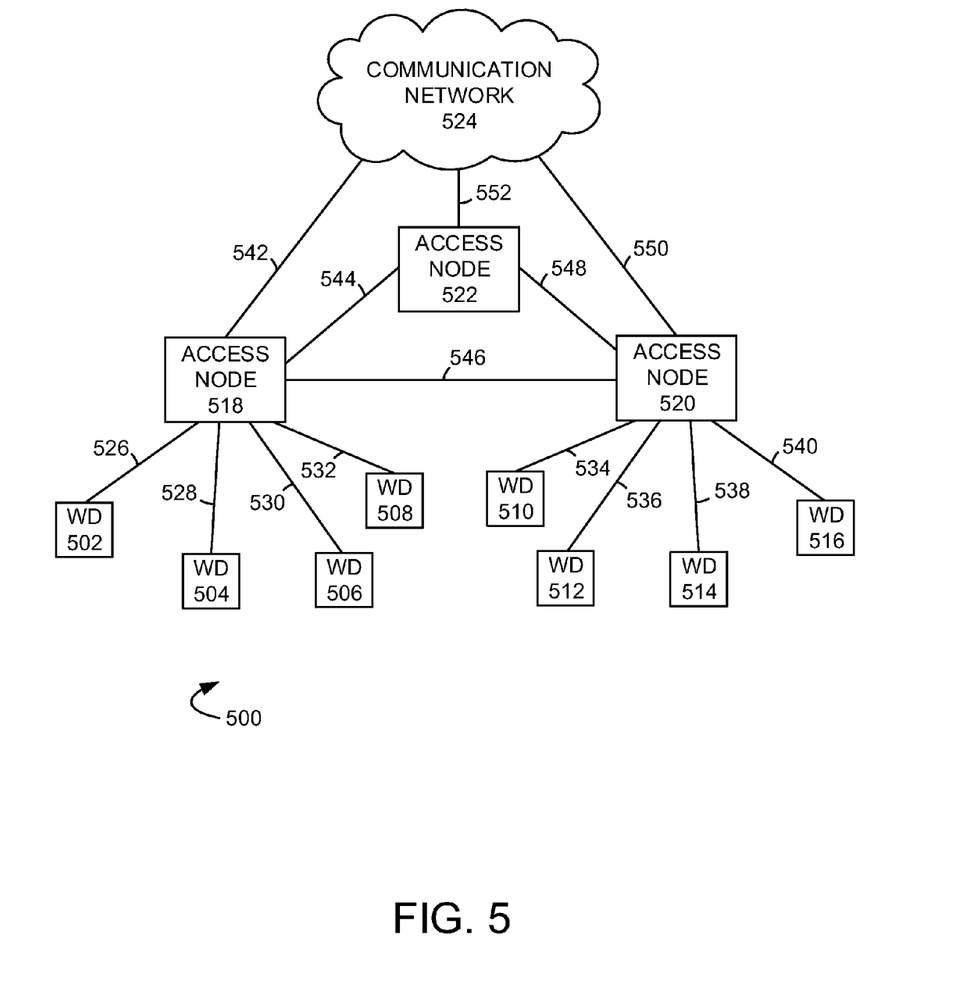
FIG. 5 illustrates another exemplary system to manage inter-cell interference.

FIG. 5 illustrates another exemplary system to manage inter-cell interference comprising wireless devices 502, 504, 506, 508, 510, 512, 514 and 516, access nodes 518, 520 and 522, and communication network 524. Examples of wireless devices 502-516 can comprise a cell phone, a smart phone, a computing platform such as a laptop, palmtop, or tablet, a personal digital assistant, or an internet access device, including combinations thereof. Wireless devices 502, 504, 506 and 508 are in communication with access node 518 over communication links 526, 528, 530 and 532, respectively. Wireless devices 510, 512, 514 and 516 are in communication with access node 520 over communication links 534, 536, 538 and 540, respectively.

Access node 518, 520 and 522 are each a network node capable of providing wireless communications to wireless devices 502-516, and can be, for example, a base transceiver station, a radio base station, an eNodeB device, or an enhanced eNodeB device. Access nodes 518, 520 and 522 are in communication with communication network 524 over communication links 542, 550 and 552, respectively. Access nodes 518 and 520 can communicate with each other over communication link 546, access nodes 518 and 522 can communicate with each other over communication link 544, and access nodes 520 and 522 can communicate with each other over communication link 548.

Communication network 524 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 524 can be capable of carrying voice information and other data, for example, to support communications by a wireless device such as wireless devices 502-516. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 524 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 524 may also comprise a wireless network, including base stations, wireless communication nodes, telephony switches, internet routers, network gateways, computer systems, communication links, or some other type of communication equipment, and combinations thereof.

Communication links 526, 528, 530, 532, 534, 536, 538, 540, 542, 544, 546, 548, 550 and 552 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 500 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 518, 520, and 522, and communication network 524 which are omitted for clarity, including additional processing nodes, routers, gateways, and physical and/or wireless data links for carrying data among the various network elements.

Figure 6:
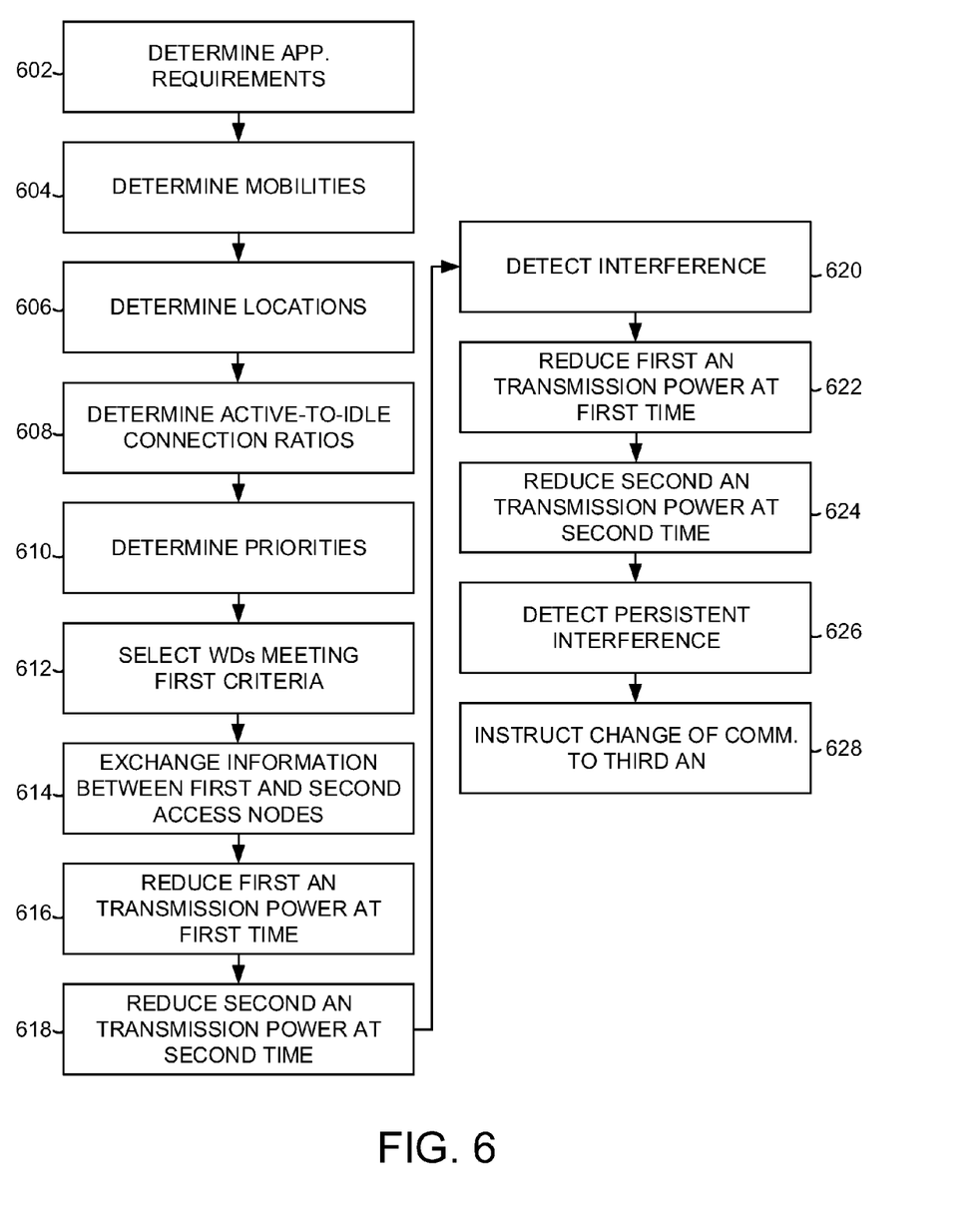
FIG. 6 illustrates another exemplary method of method of managing inter-cell interference.

FIG. 6 illustrates another exemplary method of method of managing inter-cell interference. For each of a first plurality of wireless devices in communication with a first access node, an application requirement is determined (operation 602). For example, an application requirement can be determined for each of wireless devices 502, 504, 506 and 508. The application requirement can comprise a minimum data rate, a maximum permitted data delay, a minimum throughput, a maximum error rate, a maximum data loss rate, and the like, of an application running on a wireless device. The application requirement can also be determined based on the application type, such as whether the application is a relatively delay sensitive application (such as a streaming audio application a streaming video application, a voice application, and the like) or a relatively delay insensitive application (such as an email application, a messaging application, a web browsing application, and the like).

Next, a mobility and a location are determined for each of the first plurality of wireless devices (operations 604 and 606). The mobility can comprise a direction of motion, a speed of motion, an average direction and speed of motion over time, and the like. The location of a wireless device can be determined based on GPS information of the wireless device, base station triangulation, or other information specifying the geographic location of the wireless device. The mobility and/or location of a wireless device can also be determined based on a modulation and coding scheme assigned to a communication link between the wireless device and a serving access node, since a modulation and coding scheme can be reduced as the wireless device moves away from the serving access node.

In addition, an active connection-to-idle connection ratio is determined for each of the first plurality of wireless devices (e.g., wireless devices 502-508) (operation 608). The active connection-to-idle connection ratio can indicate a level of interactivity of each wireless device with the communication network. The active connection-to-idle connection ratio can comprise a determination over a period of time of an amount of time that a wireless device is in active communication with an access node (e.g. access node 518) and an amount of time that the wireless device is in an idle or lower power state. The active connection-to-idle connection ratio can also comprise a determination over a period of time of a number of times that the wireless device changes from active communication to idle state and vice versa. When a wireless device spends a larger amount of time in active communication with access node 518, this can indicate that the wireless device comprises a relatively higher level of interactivity with communication network 500. Conversely, when a wireless device spends a smaller amount of time in active communication with access node 518, this can indicate that the wireless device comprises a relatively lower level of interactivity with communication network 500.

Based on the respective application requirement, mobility, location, and active connection-to-idle connection ratio of each wireless device, a priority is determined of each of the first plurality of wireless devices (operation 610), and at least of the one wireless device is selected, where the selected wireless device comprises a priority meeting a priority criteria from among the first plurality of wireless devices (operation 612). For example, based on the respective application requirements, mobilities and active connection-to-idle connection ratios, it can be determined that wireless devices 502 and 504 do not meet the priority criteria, and that wireless devices 506 and 508 meet the priority criteria. In an embodiment, wireless devices 506 and 508 each comprise a priority which is below a priority threshold. When the respective priorities of wireless devices 506 and 508 meet the priority criteria, wireless devices 506 and 508 can be selected.

When the at least one wireless device is selected, information about the determined priorities and selected wireless devices is exchanged between the first access node and a second access node (operation 614). For example, access nodes 518 and 520 can comprise neighbor access nodes, and further can each be in communication with one or more wireless devices, the signals to which may cause interference with signals of its respective neighbor access node. Each of access node 518 and 520 can determine priorities of wireless devices, and can select at least one of the wireless devices based on the priorities. Further, access nodes 518 and 520 can exchange information about the determined priorities and selected wireless devices over communication link 546. For example, access node 518 can provide information to access node 520 about selected wireless devices 508 and 506. In addition, access node 520 can provide information about wireless device which are selected, for example, wireless devices 510 and 512.

Using the exchanged information, a transmission power of a signal between the first access node and the at least one wireless device selected from among the first plurality of wireless devices is reduced at a first time (operation 616), and a transmission power of a signal between the second access node and the at least one wireless device selected from among the second plurality of wireless devices is reduced at a second time (operation 618). Thus, a transmission power of signals for relatively lower priority wireless devices in communication with access node 518 can be reduced at a first time, and a transmission power of signals for relatively lower priority wireless devices in communication with access node 520 can be reduced at a second time, while a transmission power of signals for relatively higher priority wireless devices in communication with access nodes 518 and 520 can remain unreduced, to reduce inter-cell interference while providing a required level of service to relatively higher priority users.

In operation 620, interference can be detected of a signal between the first access node and a wireless device of the first plurality of wireless device comprising a priority meeting a second priority criteria, and a signal between the second access node and a wireless device of the second plurality of wireless device comprising a priority meeting the second priority criteria. For example, interference can be detected of a signal between access node 518 and wireless device 502, which interference is caused by a signal between access node 520 and a wireless device in communication with access node 520 (e.g., wireless device 516). Wireless device 502 can comprise a priority which does not meet the first priority criteria, but which does meet a second priority criteria, for example, because wireless device 502 is running a voice over LTE application, is near a coverage area edge of access node 518, is located near access node 520, is relatively stationary, and further comprises a relatively high active connection-to-idle connection ratio. In an embodiment, wireless device 502 comprises a priority which is greater than a priority threshold.

When the interference is detected between the signal from access node 518 to wireless device 502, and the signal from access node 520 to wireless device 516, then the transmission power of the respective signals to wireless devices 502 and 516 can be reduced (operations 622 and 624). In an embodiment, the transmission power of the signal to wireless device 502 can be reduced at the first time, and the transmission power of the signal to wireless device 516 can be reduced at the second time. In other words, the transmission power can be reduced at the first time of both the signal between the first access node and the at least one wireless device selected from among the first plurality of wireless devices, and of the signal between the first access node and the wireless device of the first plurality of wireless devices comprising a priority meeting a second priority criteria. Similarly, the transmission power can be reduced at the second time of both the signal between the second access node and the at least one wireless device selected from among the first plurality of wireless devices, and of the signal between the second access node and the wireless device of the first plurality of wireless devices comprising a priority meeting a second priority criteria.

Thus, a reduction the transmission power of signals to wireless devices which meet the second priority criteria can be performed in addition to reducing the transmission power of signals to wireless devices which meet the first priority criteria.

In operation 626, persistent interference can be detected of the signal between the first access node and a wireless device of the first plurality of wireless device comprising a priority meeting a second priority criteria, and the signal between the second access node and a wireless device of the second plurality of wireless device comprising a priority meeting the second priority criteria. For example, despite reducing the respective transmission powers, interference can detected between the signal from access node 518 to wireless device 502, and the signal from access node 520 to wireless device 516. In an embodiment, the interference can be determined to be present for a predetermined period of time following the reduction of the transmission powers.

When the persistent interference is detected, in operation 628, one or more of the wireless devices comprising a priority meeting the second priority criteria is instructed to change from communicating with its serving access node to communicating with a third access node. For example, wireless device 502 can be instructed to change from communicating with the first access node (access node 518) to communicating with a third access node (access node 522). Additionally, or alternatively, wireless device 516 can be instructed to change from communicating with the second access node (access node 520) to communicating with the third access node (access node 522). Thus, when persistent interference is detected for one or more of the wireless devices comprising a priority meeting the second priority criteria, a handover of a higher priority wireless device can be performed to a third access node.

Figure 7:
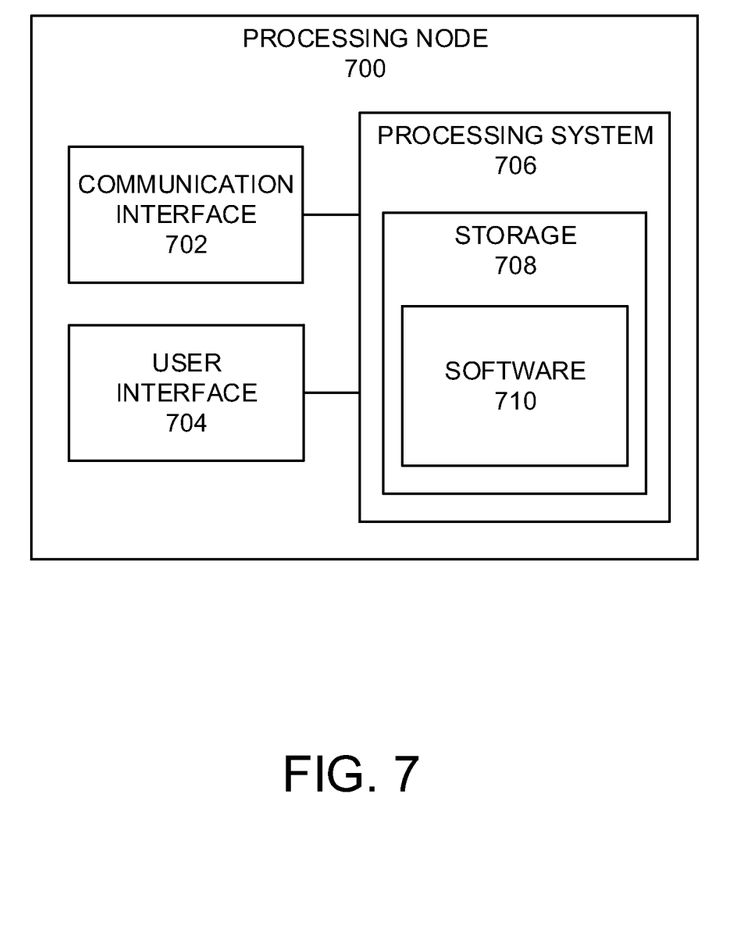
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to manage inter-cell interference. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access node 108, access node 318, access node 320, access node 518, and access node 520. Processing node 700 can also be an adjunct or component of a network element, such as an element of access node 108, 318, 320, 518 and 520. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing inter-cell interference, comprising:
   determining a first application requirement and a first mobility for each of a first plurality of wireless devices in communication with a first access node, and a second application requirement and a second mobility for each of a second plurality of wireless devices in communication with a second access node;
   determining a priority of each of the first plurality of wireless devices and each of the second plurality of wireless devices based on the respective first and second application requirements and mobilities;
   selecting at least one wireless device from each of the first plurality of wireless devices and the second plurality of wireless devices comprising a priority meeting a first priority criteria;
   exchanging information about the selected wireless devices meeting the first priority criteria among the first access node and the second access node;
   selecting, based on a detected signal interference between wireless devices of the first and second plurality of wireless devices and the respective first or second access node, at least one wireless device from each of the first plurality of wireless devices and the second plurality of wireless devices comprising a priority meeting a second priority criteria;
   reducing, based on the detected signal interference, a transmission power at a first time of the signal between a first access node and the wireless devices selected from the first plurality of wireless devices meeting the first priority criteria and the second priority criteria; and
   reducing, based on the detected signal interference, a transmission power at a second time of a signal between the second access node and the wireless devices selected from the second plurality of wireless devices meeting the first priority criteria and the second priority criteria.

2. The method of claim 1, further comprising determining an application requirement, a mobility, and an active connection-to-idle connection ratio for each of the first plurality of wireless devices and each of the second plurality of wireless devices.

3. The method of claim 2, further comprising determining a priority of each of the first plurality of wireless devices and each of the second plurality of wireless devices based on the respective application requirement, mobility, and active connection-to-idle connection ratio.

4. The method of claim 1, further comprising determining an application requirement, a mobility, and a location for each of the first plurality of wireless devices and each of the second plurality of wireless devices.

5. The method of claim 4, further comprising determining a priority of each of the first plurality of wireless devices and each of the second plurality of wireless devices based on the respective application requirement, mobility, and location.

6. The method of claim 1, further comprising:
   determining a presence of the signal interference for a predetermined period of time; and
   instructing the at least one wireless device of the first plurality of wireless devices comprising a priority meeting the second priority criteria to change from communicating with the first access node to communicating with a third access node.

7. A system of managing inter-cell interference, comprising:
   a processing node, configured to:
      determine a first application requirement and a first mobility for each of a first plurality of wireless devices in communication with a first access node, and a second application requirement and a second mobility for each of a second plurality of wireless devices in communication with a second access node;
      determine a priority of each of the first plurality of wireless devices and each of the second plurality of wireless devices based on the respective first and second application requirements and mobilities;
      select at least one wireless device of each of the first plurality of wireless devices and the second plurality of wireless devices comprising a priority meeting a first priority criteria;
      exchange, via the first access node and second access node, information about the selected wireless devices meeting the first priority criteria;
      select, based on a detected signal interference between wireless devices of the first and second plurality of wireless devices and the respective first or second access node, at least one wireless device from each of the first plurality of wireless devices and the second plurality of wireless devices comprising a priority meeting a second priority criteria;
      reduce, based on the detected signal interference, a transmission power at a first time of a signal between the first access node and the wireless devices selected from the first plurality of wireless devices meeting the first priority criteria and the second priority criteria; and
      reduce, based on the detected signal interference, a transmission power at a second time of a signal between the second access node and the wireless devices selected from the second plurality of wireless devices meeting the first priority criteria and the second priority criteria.

8. The system of claim 7, wherein the processing node is further configured to:
   determine an application requirement, a mobility, a location, and an active connection-to-idle connection ratio for each of the first plurality of wireless devices and each of the second plurality of wireless devices.

9. The system of claim 8, wherein the processing node is further configured to:
   determine a priority of each of the first plurality of wireless devices and each of the second plurality of wireless devices based on the respective application requirement, mobility, location, and active connection-to-idle connection ratio.

10. The system of claim 7, wherein the processing node is further configured to:
    determine an application requirement, a mobility, and a location for each of the first plurality of wireless devices and each of the second plurality of wireless devices.

11. The system of claim 10, wherein the processing node is further configured to:
    determine a priority of each of the first plurality of wireless devices and each of the second plurality of wireless devices based on the respective application requirement, mobility, and location.

12. The system of claim 7, wherein the processing node is further configured to:
    determine a presence of the signal interference for a predetermined period of time; and
    instruct at least one wireless device of the first plurality of wireless devices comprising a priority meeting the second priority criteria to change from communicating with the first access node to communicating with a third access node.

* * * * *